(12) United States Patent
Huang et al.

(10) Patent No.: US 7,476,443 B2
(45) Date of Patent: Jan. 13, 2009

(54) PHOTO-STABLE AND SURFACE-FUNCTIONALIZABLE COLORANT PARTICLES

(75) Inventors: Lei Huang, Duluth, GA (US); Xuedong Song, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 353 days.

(21) Appl. No.: 11/229,969

(22) Filed: Sep. 19, 2005

(65) Prior Publication Data
US 2007/0065743 A1   Mar. 22, 2007

(51) Int. Cl.
*B32B 5/16* (2006.01)

(52) U.S. Cl. .......................... 428/403; 428/407; 428/421

(58) Field of Classification Search ................. 428/403, 428/407, 421
See application file for complete search history.

(56) References Cited

U.S. PATENT DOCUMENTS

| | | | |
|---|---|---|---|
| 4,452,861 A | | 6/1984 | Okamoto et al. |
| 5,100,946 A | * | 3/1992 | Hung et al. ................. 524/397 |
| 5,152,287 A | * | 10/1992 | Kane .......................... 600/364 |
| 5,171,772 A | | 12/1992 | Hoy et al. |
| 5,328,800 A | * | 7/1994 | Yokoya et al. .............. 430/203 |
| 5,500,286 A | | 3/1996 | Someya et al. |
| 5,589,194 A | | 12/1996 | Tsuei et al. |
| 5,977,241 A | | 11/1999 | Koloski et al. |
| 6,232,386 B1 | | 5/2001 | Vargo et al. |
| 6,288,142 B1 | | 9/2001 | Bugnon et al. |
| 6,375,864 B1 | * | 4/2002 | Phillips et al. .......... 252/301.33 |
| 6,608,129 B1 | | 8/2003 | Koloski et al. |
| 7,238,301 B2 | * | 7/2007 | Huang et al. ........... 252/301.35 |
| 7,247,375 B2 | * | 7/2007 | Song et al. .................. 428/403 |
| 2005/0285082 A1 | * | 12/2005 | Huang et al. ........... 252/301.16 |

FOREIGN PATENT DOCUMENTS

| | | |
|---|---|---|
| EP | 0466646 A1 | 1/1992 |
| EP | 1270681 A2 | 1/2003 |
| GB | 686269 | 1/1953 |
| GB | 998188 | 7/1965 |
| GB | 1156653 | 7/1969 |
| WO | WO 2004/016418 | 2/2004 |
| WO | WO 2006/007184 | 1/2006 |

OTHER PUBLICATIONS

McLaren, K., "The Spectral Regions of Daylight Which Cause Fading," *The Journal of the Society of Dyers and Colourists*, vol. 72, 1956, pp. 86-99.

* cited by examiner

*Primary Examiner*—H. T Le
(74) *Attorney, Agent, or Firm*—Vincent T. Kung (57) ABSTRACT

A composition and method for encapsulating colorant molecules in polymeric particles are described. Colorant molecules, such as dye, are doped or embedded in a particle, at least in part, composed of a halogen-containing polymeric matrix that can effectively isolate the dye molecules from reaction with photo-oxidizing or reducing agents. The isolated colorant molecule is protected from photo-bleaching and other color degradation, and show superior photo-stability. The encapsulating polymer matrix can be cross-linked and can have a variety of surface functional groups, which may be adapted to help achieve either strong ionic or covalent binding to desired substrates. Also described are methods for producing protective particles, and ink mediums for applying the particles to substrates.

18 Claims, 7 Drawing Sheets

Photo-stability Test Result for Disperse Orange Dye
(D3- Control, D4 – after 2 hours photo-bleaching)

FIG. 13

Photo-stability Test Result for Disperse Orange Dye Particles
(B3- Control, B4 – after 2 hours)

FIG. 14

Photo-stability Test Result for Disperse Blue Dye Particles
(C3- Control, C4 – after 2 hours)

FIG. 15

PHOTO-STABLE AND SURFACE-FUNCTIONALIZABLE COLORANT PARTICLES

FIELD OF INVENTION

The present invention relates to halogen-containing polymeric systems for use with dye molecules. More particularly, the invention describes particle systems developed from halogen-containing polymers, copolymers or oligomers for encapsulating photo-oxidation-sensitive dye molecules, which are either insoluble in water or of low-aqueous solubility, to make photo-stable and surface-functionalizable dye/ink particles.

BACKGROUND

A major problem with colorants is that they tend to fade when exposed to electromagnetic radiation, such as sunlight or artificial light. It is believed that most of the fading of colorants when exposed to light is due to photo-degradation mechanisms. These photo-degradation mechanisms can be attributed to either photo-induced oxidation or reduction of the colorant molecules depending on the environmental conditions in which the colorant is placed. Fading of colorants also depends on the surface chemistry or nature of the type of substrate upon which they reside.

Product analysis of photo-stable products and intermediates has revealed several important modes of photodecomposition. These include electron ejection from the colorant, reaction with ground-state or excited singlet state oxygen, bond cleavage to form various products, reduction to form colorless leuco dyes, and electron or hydrogen atom abstraction to form radical intermediates.

Various factors, such as temperature, humidity, gaseous reactants, including $O_2$, $O_3$, $SO_2$, and $NO_2$, and water soluble, nonvolatile, photo-degradation products have been shown to influence fading of colorants. The factors that effect colorant fading appear to exhibit a certain amount of interdependence. It is due to this complex behavior that observations for the fading of a particular colorant on a particular substrate cannot be applied to other colorants and substrates in general.

An increase in relative humidity of the atmosphere under conditions of constant temperature increases the fading of a colorant for a variety of colorant-substrate systems (e.g., McLaren, K., *J. Soc. Dyers Colour*, 1956, 72, 527). For example, as the relative humidity of the atmosphere increases a fiber may swell because the moisture content of the fiber increases. This helps diffusion of gaseous reactants through the substrate structure.

The ability of a light source to cause photochemical change in a colorant is also dependent upon the spectral distribution of the light source, in particular the proportion of radiation of wavelengths most effective in causing a change in the colorant and the quantum yield of colorant degradation as a function of wavelength. On the basis of photochemical principles, it would be expected that light of higher energy (i.e., short wavelengths) would be more effective at causing fading than light of lower energy (i.e., long wavelengths). Studies have revealed that is not always the case. Over 100 colorants of different classes were studied and found that, generally, the most unstable were faded more efficiently by visible light, while those of greater lightfastness were degraded mainly by ultraviolet light (McLaren, K., *J. Soc. Dyers Colour*, 1956, 72, 86).

The influence of a substrate on colorant stability can be extremely important. That is, the kind or nature of substrate material on or in which a colorant is situated can influence colorant stability. Color fading can be either retarded or promoted by some chemical groups within the substrate. For instance, such a group may be a ground-state species or an excited-state species. Porosity of the substrate can also be an important factor in colorant stability. A highly porous substrate can facilitate penetration of moisture and gaseous reactants into the substrate and encourage fading of a colorant. A substrate may also act as a protective agent by screening the colorant molecules from light wavelengths capable of causing degradation.

A need exists for a colorant system, which provides protection to a colorant molecule. A protective encapsulation can shelter sensitive colorant molecules from interaction and degradation caused by such reactants as described above. Encapsulation is a procedure to enclose a molecule, such as a colorant material, in an amorphous solid or semi-solid, such as a polymeric matrix. Persons in the textile dyeing or other associated industries, for instance, would much welcome methods and compositions, which are capable of stabilizing a wide variety of colorants, regardless of the innate stability of the colorant, from the detrimental effects of ambient air and photo-illumination.

A photo-stable colorant can benefit various manufacturers with a means to more easily control precise hues and tints when dyeing or printing, especially when combinations of colors are used. Depending on the particular particle size distribution, the particles can be incorporated as part of many kinds of colored inks for a wide variety of applications. Additionally, functionalization of the particle surfaces can enable one to practice post-treatment or post curing of prefabricated articles and have the particles attached stably to the article substrate. These and other advantages of the present dye particles can simplify and/or standardize currently complicated dye or printing processes.

SUMMARY OF THE INVENTION

The present invention addresses the needs described above by providing, in part, a photo-stable colorant particle, and methods for photo-stabilizing colorant molecules in the particle. The methods involves creating a material vehicle, such as an encapsulating particle, derived from halogen-containing polymeric systems that are used to surround photosensitive colorant molecules, such as dyes.

A colorant molecule is contained in a halogen-containing polymer matrix or network which forms a particle that protects the colorant from environmental agents, which may degrade the colorant. In certain embodiments, the encapsulation system can be adapted to suite particular dye molecules, which can be either a) insoluble or have low solubility in water, or b) have good aqueous solubility. The polymer systems involve at least one halogen-containing polymer chain with a significant portion of halogen atoms ($\geq 5$ atomic wt. %). The halogen atoms may include anyone of the following: fluoride, chloride, bromide, or iodide. The halogen-containing polymers can be either crosslinked or non-crosslinked to each other. Alternatively, the particles can be either cross-linked to other kinds of polymer moieties or substituents. When cross-linked, those polymer molecules tend to be more mechanically stable than their non-cross-linked counterparts and the particles are chemically stable in a medium that includes solvents, surfactants, or electrolytes. Also, the cross-linked colorant particles are resistant to physical degradation under pH environments of about 2-12, and are thermally stable in a temperature range of about 1° C. to about 120° C.

According to other features, at least one monomer unit in the polymer molecule has a functional group, which, when incorporated, facilitates crosslinking and further functionalization of the surface of the colorant particle to enhance attachment mechanics to substrates, such as fabrics, or for better solubility in an ink/dye solution. A functionalized polymer matrix can enhance the physical and/or chemical properties of the encapsulated colorant particles. For instance, one can modify the surface charge to enhance the propensity to disperse in a carrier medium, or the relative compatibility and stability of the particles with the material of a substrate to be colored. The polymer constituents on the outer surface of the material vehicle or particle capsule can provide a functionalized or functionalizable surface, which can be further modified, as one may desire, to permit the colorant-encapsulated particle to attach to different kinds of substrates. The surface properties of the colorant particle can be modified through selective incorporation of desired functional groups that will make the polymeric matrix compatible to bind with substrates.

According to an understanding of the photostabilizing mechanism, halogen-containing polymers form a tight, protective casing around one or more colorant molecules. The spatial configuration or conformation of the polymers isolates the colorant molecules, preventing them from leaching out, as well as preventing photo-reactive agents, such as gaseous molecules, from infiltrating into the capsule. It is believed that the encapsulation maintains a relatively low oxygen partial pressure in the matrix of the capsule. The encapsulated colorant molecules within the polymer matrix may have either a random oriented within the material vehicle or the colorant molecules can be attached to the constituents of the polymer molecules in the encapsulating matrix by either covalent, ionic, or hydrogen bonding. Each particle or material vehicle can have a mean particle size that ranges from nanometer (nm) to micrometer (μm)-scale dimensions. In particular, the particles can have a mean particle size in a range from about 9 nm to about 80 μm. Typically, the particles have a mean particle size in a range from about 50 nm to about 15 μm.

Colorants encased within the halogen-containing polymer network, according to the present invention, form dye particles that is more photo-stable and tend not to bleach or experience detrimental effects associated with colorfastness when exposed to light.

The invention provides methods of making cross-linked colorant or dye particles, which are more stable than non-cross-linked counterparts and more resistant to temperature, surfactants, and organic solvents. The invention also provides methods of making cross-linked particles with functionalizable surfaces which can further interact with chemistries of textile surfaces.

According to another aspect, the present invention pertains to a colorant "ink" composition medium or colloidal suspension that includes the dye particles. The colorant particles can be made miscible and mixed in either an aqueous or organic solvent-based solution to create photo-stable and dye/ink solutions that can bind to selected fabrics or other substrate materials. The colorant particles can be prepared at various concentrations and solution systems like aqueous or organic solvent-based solution. Examples of organic solvents systems include but are not limited to iso-octane, cyclohexane, toluene, ethers, alcohols, tetrahydrofuran, chloroform, methylene chloride, ethylene dichloride, ethyl acetate, methanol, ethanol, ethylene glycol, diethylene glycol, and triethylene glycol. The weight concentrations of colorant particles can vary from about 1% to over 50%, up to about 80% or 90%, depending on the color visual-intensity desired. In addition a dispersant aid and surfactant also could be included. The dispersant aid may include surface active surfactants, metal oxide particles and polymeric compounds, and the surfactant may include reactive surfactants, amphoteric compounds, sulfates, sulfonates, cationic compounds.

In yet another aspect, the invention relates to a work piece or article of manufacture that has includes a portion with a coating of the colorant particles, and a method of dyeing the colorant solution. About 1-50% of crosslinkable colorant particles may be present in a formulation of a dyeing solution, which may contain some of surfactants or particle stabilizers; an extra crosslinking agent, such as compounds having carboxylic acid groups, ethanolamine groups, hydroxyl groups, amine groups, amino groups, imine group, epoxy groups, isocyanate groups, melamine groups, metal alkoxides, hydrolysable organosilyl groups and beta-ketoester groups may optionally be mixed in solution. Cross-linking can be brought by heating at about 80-120° C. for about 2-12 hrs.

Additional features and advantages of the present invention will be revealed in the following detailed description. Both the foregoing summary and the following detailed description and examples are merely representative of the invention, and are intended to provide an overview for understanding the invention as claimed.

DETAILED DESCRIPTION OF THE INVENTION

Section I—Definitions

Before describing the present invention in detail, it is to be understood that the terminology used herein is for the purpose of describing particular embodiments only, and is not intended to be limiting. As used in this specification and the appended claims, the singular forms "a," "an," and "the" include plural referents unless the context clearly dictates otherwise. Unless defined otherwise, all technical and scientific terms used herein have the same meaning as commonly understood or generally accepted by one of ordinary skill in the art to which this invention pertains.

The term "colorant" as used herein refers to any organic material that can impart a color tint, hue or pigmentation, which is susceptible to photo-induced bleaching, fading or other degradation.

The term "colorfast" or "colorfastness" as used herein refers to the characteristic of being resistant to fading; i.e., the property of a dye to retain its color when the dyed article, typically a fabric or textile material, is exposed to environmental conditions, such as light, perspiration, atmospheric gases, or washing that can remove or destroy the color.

The term "dye" as used herein refers to either a natural or synthetic organic colorant.

The term "encapsulation" as used herein refers to the enclosure of a molecule, such as a colorant material, in an amorphous solid or semi-solid, such as a polymeric matrix. In other more generalized words, the terms may refer to a solution of a solid solute in a solid matrix solvent. Such encapsulation may be generated, according to an embodiment, by creating a liquid solution containing a dissolved dye material and a dissolved polymer and then co-precipitating the dye material and the polymer, such that the dye material becomes dispersed inside a matrix of the solid polymer material. The particles thus precipitated may be viewed as a solid solution of a dye material dissolved (or dispersed) in a solid polymer matrix solvent.

The term "halogen" herein refers to the elements of Group VII A of the Periodic Table and includes fluorine, chlorine, bromine and iodine. For purposes of the present invention, the term "halogen" also refers to molecules containing fluoride, chloride, bromide and iodide atoms and may include, but is not limited to, halogenated compounds such as halocarbons.

The term "halogen-containing polymer" and "halogen-containing co-polymer" (also called "HCPs") refers to a macromolecule formed by the chemical union of monomers at least a portion of which are halogen containing monomers. Exemplary HCPs include, but are not limited to, halogen-containing polyvinyl compounds, halogen-containing polyvinylidene compounds and various blends, mixtures and combinations thereof.

The term "photo-stable" refers to the relative stability of colorant molecules to maintain their true color, tint, or hue. The terms is used to describe the stable characteristic of colorants within an encapsulation particle to resist color fading or bleaching, or other degradation that arise from photo-induced reactions with environmental oxidizing or reducing agents.

The term "surface-functionalizable" refers to the presence of chemical functional groups on the surface of colorant particles that are adapted for further chemical or physical reactions. The functional groups can be used to modify a particle's surface or create cross-linked particles. Examples of functional groups include: epoxy; aldehyde; carboxyl acid; hydroxyl; primary, secondary, or tertiary amines; amino; imines; melamine; isocynate; sulfonate; metal alkoxides; hydrolysable organosilyl; beta-ketoester, or polyethylene glycol groups.

Section II—Description

The present invention relates in general to a photo-stable colorant system that involve cross-linkable and surface functionalizable particles that encapsulate sensitive colorant molecules within a matrix or network of halogen-containing polymers and co-polymers (HCPs), and methods for producing the protective particles. The particles can have an average size that ranges from dimensions with nanometers to micrometers. The invention also involves applications for the colorant particles, particularly for textile dyeing, inks, or printing and paint applications.

Colorant agents such as dyes and pigmented inks often are exposed to oxidizing agents that degrade their respective colorfastness. Typically, dyes are subjected to degradation by either photo-oxidation or reduction of the dye molecule, replacing certain atoms with others, which can change the visual properties of the color. Encapsulation is a technique known in the art for protecting components that are either sensitive to the elements, or for providing time-released delivery of active ingredients. The invention describes, in part, the production of cross-linked colorant micro- and nano-particles and applications of those particles. The invention uses halogen-containing polymers and co-polymers (HCPs) as an encapsulation matrix to protect colorant molecules, such as dyes, within micro- or nano-particles. The color characteristics, such as hues and vividness, of these encapsulated dyes are substantially protected from degradation agents such as oxygen and water molecules at ambient conditions.

Similar to polymer materials developed to protect photophorescent molecules, such as described in U.S. patent application Ser. No. 10/879,933, by Huang et al., the present invention builds upon and expands the understanding of encapsulation with halogenated or functionalized polymer for preserving colorant materials. As Huang et al. explain in their patent application, phosphorescence is generated through an irradiative decay process from a triplet excited state to a singlet ground state. Usually, the decay process is not favored and many other potential decay processes compete with it. Some molecules, however, do exhibit strong phosphorescence. Most of them have strong phosphorescence only under low temperature conditions and oxygen-free environment. The reason for requiring oxygen-free environment is that oxygen itself is in a triplet ground state and energy transfer from the triplet excited state of phosphorescent molecules to the triplet ground state of oxygen is usually favored process to quench the triplet excited state of the phosphorescent molecules. The energy transfer process, namely the phosphorescence quenching process, usually does not involve chemical reactions. One of the main purposes for encapsulation of phosphorescent molecules in a halogen-containing polymeric matrix is to shield oxygen from the phosphorescent molecules to minimize the phosphorescence quenching process.

On the other hand, for purpose of the present invention, the photo-bleaching process involves chemical reaction, and is distinct from phosphorescence quenching. Whereas phosphorescence quenching is not associated with chemical reaction in most cases, and as a consequence of the process a decrease in phosphorescence emission is observed, photo-bleaching is usually associated with chemical reactions and degradation of the dye molecules and, consequently, the light absorption property (e.g., absorption spectrum and extinction coefficient constant) will change. In phosphorescence quenching, absorption spectrum and extinct coefficient constant are usually not affected. A major reason that dye molecules suffer from photo-bleaching can be attributed to the susceptibility of the dye molecules to oxidation. Under normal, ambient conditions, dye molecules are exposed to air and light. In most cases, oxygen is the oxidizing agent, but other molecules, such as $NO_2$, can also oxidize dyes molecules in the presence of photons to degrade the dye molecules. Photons with all levels of energy (high, medium, or low energy) also can greatly increase the degradation process (oxidization/reduction).

One way to avoid the degradation of colorant molecules by oxidization or reduction is to encapsulate the molecules within a solid matrix to shield them from reacting with oxygen, water, and other gases. Selection of the encapsulation matrix is important. The matrix should have relatively low oxidizing-gas permeability and have relatively high solubility of dye molecules so that high loading of the colorant molecule can be achieved. Various functional groups of mono- or poly-dispersed colorant particles may be desired for use with various functional groups to allow surface modifications.

Different types of matrices have been used for encapsulation of molecules to form particles. These matrices include both inorganic materials and organic polymers. Of the polymers used for encapsulation of molecules to form particles, polystyrene (PS) and polyacrylonitrile (PAN) and their derivatives have been commercially used. These polymeric systems, however, have various drawbacks. For instance, the polymeric systems do not allow for maximal protection at ambient conditions; nor do the existing systems provide the ability to cross-link the encapsulated particles. A polystyrene matrix is not ideal for encapsulation of colorant molecules because of the poor solubility of many colorant molecules (sometimes referred to as "dyes") in polystyrene, which results in low dye loading or relatively low color intensity. The oxygen permeability and solubility of polystyrene is also believed to be relatively high. PAN and its derivatives have been found to have low oxygen permeability but they have limited solubility for many colorant molecules as well, which also limits their application for encapsulation of those colorant molecules.

There is a need for new matrix systems for the encapsulation of colorant molecules to preserve their color intensity. The new matrix systems can be cross-linked so they can be more stable than the non-cross-linked counterparts and are also more resistant to temperature, surfactants, and organic solvents.

Many kinds of dyes, pigments or other kinds of colorants can be incorporated as dopants in the polymer matrix. Most typically, the dye are those used for dying textile fibers. For instance, but not limited to, organic aromatic compounds with conjugated double bonds systems, carrying chromophores, auxochromes and/or other functional groups. In terms of chemical classification, the dyes may be selected from azo dyes (mono. azo, diazo, triazo, etc.), carbonyl dyes, (anthraquinone derivatives and indigo derivatives), cyanine dyes, phthalocyanine dyes, di- and tri-phenylmethane dyes, etc.

In terms of method of application, the colorants can be classified as: acidic or basic dyes, direct and developed dyes, azoic dyes or naphthols, sulfur-based dyes, vat dyes, reactive dyes, or dispersed dyes. In terms of solubility classification, the dyes can be: aqueous soluble dyes (anionic and cationic), dispersed dyes (very slightly soluble, nonionic), and pigments (insoluble).

The colorant molecule is associated with the functionalized HCP matrix in a variety of configurations. The term "associated" in its broadest sense refers to the colorant being at least in close proximity to the functionalized HCP molecular shell. For example, the colorant may be maintained either in close physical proximity alone within an encasement of HCP, or in close proximity to the functionalized molecular network by hydrogen bonding, van der Waals forces, or other similar associations. Alternatively, the colorant molecules may be either ionically or covalently bonded to the functionalized HCP network. As another example, the colorant may be at least partially included within the cavity of the HCP matrix. Preferably, the colorant molecules are entirely enveloped or entombed within the HCP matrix.

Another important problem is the affinity of a dye for a textile fiber, and this involves both the chemical nature and physical state of the dye. That is, whether the dye is acidic or basic, and whether colloidal, molecular, or ionic. The present encapsulated particles have a polymer surface coating that can be modified or designed specifically with moieties that have affinity to the particular textile surface. The dye particles especially cross-linked particles are fairly resistant to pH, salts and other electrolytes such as found in perspiration or other bodily fluids.

The present invention, according to an aspect, describes photo-stable dye capsules or particles that can be crosslinkable and functionalized for use in textile dyeing and ink applications. The capsules are formed of a polymeric matrix of either a single or multiple kinds of halogen-containing polymers, and/or a combination of halogened and non-halogenated polymer molecules. The surface of each encapsulating particle capsule can be modified to have functional groups, such as —COOH, —$NH_2$, —OH, etc., present or incorporated into the dye/ink particle surface. The functional groups can be employed to attach the particles to a fiber, membrane or other substrate, or further functionalize the surface for a wide range of applications.

Section A.—Particles

The present invention can be used to make a wide variety of colorant particles depending on the desired properties of the substrates, which can be a woven or nonwoven textile or fabric, as well as other organic or inorganic materials. For instance, one may wish to use the colorant particles for dyeing or printing cellulosic materials, paper, cotton, rayon, silk, or other protein fibers. For instance, dispersed dyes such as in the examples are mostly employed for dyeing polyesters, acetates, polyamides, acrylics and other hydrophobic fibers.

According to an example of the present invention, the HCP particles can be used as a material vehicle or matrix that can be adapted to improve the solubility, intensity and adherence of disperse dyes. As low-molecular weight derivatives of clearly defined chemical classes:, azo, anthraquinone, nitroarlyamine, nitrodiphenyl amine, and other compounds, disperse dyes are non-ionic, aromatic coloring substances. They almost all contain amino or substituted amino groups but no solubilizing sulfonic acid groups; hence, they are water insoluble dyes and are suitable for dyeing hydrophobic fibers, such as cellulose acetate, tri acetate, polyamide, polyester, polyacrylonitrite etc. They melt at above 150° C. and are crystalline materials which are ground to produce particles of about 0.5-2 μm in size.

As their name suggests, disperse dyes are introduced as a dispersion or colloidal suspension in water and are absorbed by the fiber, after which they may remain either untreated or are post-treated (diazotized) to produce the final color. These kinds of dyes are primarily used for cellulose acetate, triacetate, polyamide, nylon, polyester, polyacrylonitrite, and other synthetic fibers, and for thermoplastics. Disperse dyes are especially important for polyester fibers as they are widely used as a component of blends with any other man made fiber and natural cotton, flax, or wool fibers.

Like most of other types of dyes, disperse dyes can experience problem with colorfastness when exposed to light. The disperse dyes that are derived from anthraquinone have been found to be effected by oxides of nitrogen (e.g., $N_2O$), which are present commonly in gas fumes and fumes from industrial areas. Exposure and reaction of dyes with nitrogen oxide results in fading or bleaching of color. Currently, fabric dyes that contain or use sensitive disperse dyes, in particular those of blue and violet colors, have to be treated with certain chemicals that act as inhibitors to prevent gas fading. Further, dispersing agents are needed to produce a stable colloidal dispersion in the dye bath. Under current technology, the size distribution range of dye particles is very great, which can cause non-uniform results in the dye application process. With the present invention, one can control the size distribution of encapsulated dye particles.

One way to improve light colorfastness is to encapsulate the dye molecule in a halogen-containing polymer or copolymer system, which makes the dye molecule more stable. Other polymers, like polystyrene (PS) and polyacrylonitrile (PAN), may also be used achieve the purpose. However, the photo-stability and dye intensity achieved by those polymers may not be as good or ideal as that achieved in halogen-containing copolymer systems. One possible reason for this phenomenon may be that the other kinds of polymer matrices have relatively high degree of oxygen ($O_2$) solubility. Another possible reason is the solubility of most of disperse dyes are usually low. As a result, the disperse dyes often aggregate to have a low dye intensity.

A dye encapsulation, the encapsulation comprising: a halogen-containing polymer or copolymer having a halogen-atom content of greater than about 5% of overall atomic weight of said polymer molecule, said polymer having monomer units that contain a reactive functional group including either a —COOH, —NH$_2$, or —OH.

HCPs such as polyvinyl fluoride (PVF) and polyvinyl chloride (PVC) have been found to provide high loading of many colorant molecules, which often have poor solubility in most organic solvents and solid matrices. HCPs, just like carbon halide solvents such as chloroform and methylene chloride, have very good compatibility with many organic compounds, including metal chelates with organic ligands. Although the present invention should not be held to any particular theory of operation, it is believed that the use of HCPs as encapsulation polymer matrices can increase loading, reduce molecular aggregation and increase the homogeneous distribution of the encapsulated molecules in the matrices, features which are extremely beneficial when colorant particles of high color intensity are desired. In contrast, the use of a polymer matrix with poor compatibility and solubility with the encapsulated colorant molecules most likely will result in the molecular aggregation, low color intensity and possible distortion of their spectral properties.

Figure 1:
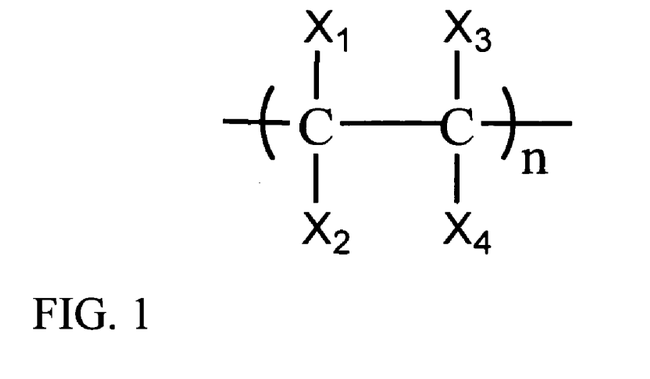
FIG. 1 shows a generic structural diagram of a halogen-containing polymer molecule, which can be incorporated within the present invention.

The HCPs should have at least one percent by mass weight of halogen atoms. The HCPs can have a general structure as shown in FIG. 1, in which the halogen content is desirably between about 5 and 90 weight percent, more desirably between 10 and 80 weight percent, and even more desirably between 30 and 70 weight percent. In the structure of FIG. 1, at least one of X1-X4 contains one or more halogen atoms. The others among X1-X4 can be other atoms or groups, such as hydrogen atoms and methyl groups. Some specific examples of HCPs include, but are not limited to, polyvinyl fluoride (PVF), polyvinyl chloride (PVC), polyvinyl bromide (PVB), polyvinyl iodide (PVI), polyvinylidene fluoride, polyvinylidene chloride, polyvinylidene bromide, polyvinylidene iodide, and their derivatives.

Figure 2:
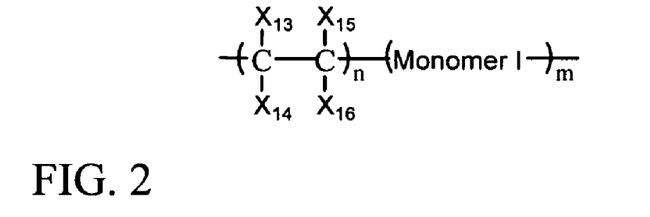
FIG. 2 shows a generic structural diagram of a halogen-containing co-polymer.

The halogen-containing co-polymers can have a general structure as shown in FIG. 2, in which the halogen content of the polymer is between about 5 and 90 weight percent, more desirably between about 10 and 70 weight percent, and even more desirably between about 30 and 70 weight percent. At least one of X13-X16 contain one or more halogen atoms and monomer I represents, for example, ethylene, propylene, or other chemical moieties.

Figure 3:
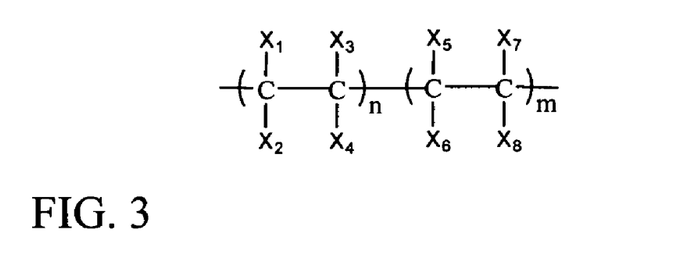
FIG. 3 shows a generic structural diagram of another halogen-containing co-polymer.

Co-polymers with a general structure of FIG. 3 are more desirable, in which at least one of X1-X4 contains one or more halogen atoms. The others among X1-X4 can be other atoms or groups, such as hydrogen atoms and methyl groups. In the structure of FIG. 3, at least one of X5-X8 is a hydrophilic group. Examples of hydrophilic groups include, but are not limited to, carboxylic acid groups, ethanolamine groups, hydroxyl groups, amine and amino groups, imine group and polyethylene glycol groups. Specific examples of the halogen-containing co-polymers include, but are not limited to, co-polymers of vinyl fluoride, vinyl chloride, vinyl bromide and vinyl iodide with other monomers such as acrylic acid and methacrylic acid. The halogen-containing monomer is desirably a significant portion (greater than 50 weight percent) of the co-polymers.

Figure 4:
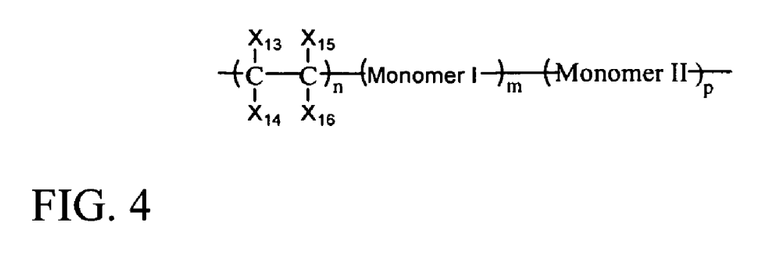
FIG. 4 shows a generic structural diagram of another halogen-containing co-polymer.
Figure 5:
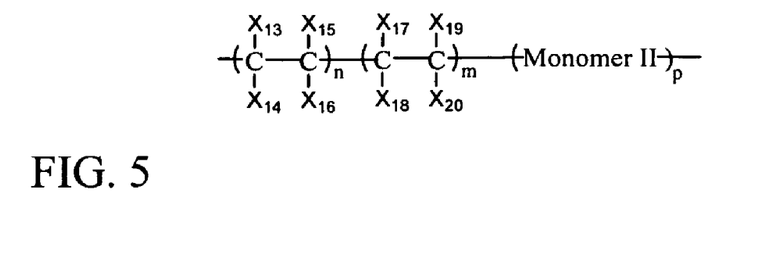
FIG. 5 shows a generic structural diagram of another halogen-containing co-polymer.

The halogen-containing co-polymers can also have a general structure as shown in FIGS. 4 and 5, in which the halogen content is between about 5 and 80 or 90 weight percent, more desirably between 10 or 30 and 60 or 70 weight percent. The co-polymers consist of at least three different monomers in which the monomers with halogen content (X13-X16) are preferred to be the major components (greater than 50 weight percent). Two of the three monomers can be the same as the monomers in the co-polymers shown in FIG. 2 and the other monomer can be varied, based on the desired characteristics of the particles. In the structure of FIG. 5, at least one of X17-X20 is a hydrophilic group as generally discussed above.

The colorant molecules which may be used for encapsulation by the halogen-containing polymers and co-polymers can have various structures. They can be organic compounds, organic/inorganic hybrid materials, and metal chelates with organic ligands. Colorant molecules suitable for encapsulation include, but are not limited to, acidic or basic dyes, direct and developed dyes, azoic dyes or naphthols, sulfur-based dyes, vat dyes, reactive dyes, or dispersed dyes. In terms of solubility classification, the dyes can be: aqueous soluble dyes (anionic and cationic), dispersed dyes (very slightly soluble, nonionic), and pigments (insoluble).

Section B.—Fabrication

The present photo-stable material particles can be fabricated according to a variety of methods or techniques. One method for making photo-stable dye particles involves the steps of providing a polymeric matrix containing either one or more kinds of halogen-containing polymers, or a combination of at least one kind of halogen-containing polymer and a non-halogenated polymer, the polymeric matrix having at least about 5 atomic wt. % of halogen atoms; suspending the polymeric matrix in an liquid solution; providing one or more kinds of dye molecules in the liquid solution; doping the dye molecules in the polymeric matrix; forming a particle precipitate such that said polymeric matrix encapsulates and sterically isolates said dye molecules from reacting with an oxidizing agent.

According to an embodiment of making colorant particles, dye molecules and an encapsulating matrix containing halogen polymers or copolymers or oligomers are dissolved together in a solvent. The dye molecules and the polymer matrix are co-precipitated by a precipitating solvent to form colorant particles. The methods and processes according to the present invention to produce colorant particles include the steps of: (1) dissolving halogen-containing polymers or co-polymers (HCPs) and colorant molecules in a dissolving solvent with optional heating to make a first mixture; (2) mixing the first mixture with a precipitating solvent in which both the polymers and colorant molecules have poor solubility to make a second mixture; (3) washing the formed particles; and (4) drying the particles or re-suspending the particles in storage/use medium. If desired, the colorant particle can be further crosslinked to each other according to various procedures or methods.

Selection of any particular dissolving solvents and precipitating solvents depends not only upon the particular characteristics of the HCPs and colorant molecules, but also the surface properties and sizes of the particles desired. The dissolving solvents may or may not be completely miscible with each other. On one hand, the dissolving solvents should exhibit good solubility for both the encapsulating polymer/copolymers and the colorant dye molecules. The dissolving solvents can be made from either a single chemical species or mixtures of several chemicals. Examples of dissolving solvents include, but are not limited to, dimethylformamide (DMF), dimethylsulfoxide (DMSO), tetrahydrofurane (THF), methanol, ethanol, propanol, pentane, pentene, hexane, methyl ethyl ketone, acetone, acetonitrile, methylene chloride, cyclohexane, chloroform, and mixtures thereof. One the other hand, the polymers/co-polymers and colorant molecules should have relatively poor solubility in the precipitating solvents, which may be polar or non-polar in nature. Like the dissolving solvents, the precipitating solvents also can be composed of either one chemical species or a mixture of several chemicals. Specific precipitating solvents may be selected from the same listing as the dissolving solvent, but since the desired function is opposite, the specific chemical ingredient may not be the same chemical in any particular instance. In other words, for example, if water were used as the dissolving solvent, water cannot again be used as the precipitating solvent.

According to another embodiment of making colorant particles, one may employ a technique that involves emulsion polymerization, such as described in U.S. Pat. No. 5,500,286, to Mitsui Toatsu Chemicals, Inc., incorporated herein by reference. Emulsion polymerization is a type of polymerization process in which the end result is a stable aqueous dispersion of polymer particles, typically about 50-500 nm in diameter. The typical component for emulsion polymerization involves monomer, initiator, surface active agent (surfactant), and water. The surfactant molecules have a hydrophilic end and a hydrophobic end. Since they are in water, many surfactant molecules get together and form small spheres with the hydrophilic ends on the outside, in contact with the water, and the hydrophobic ends on the inside, protected from the water. These spheres of surfactant molecules are known as micelles. Since the monomer being added is also hydrophobic, it forms inside the micelles with the other hydrophobic molecules. The initiator being used dissociates into very reactive free radicals under certain conditions (heat, ultraviolet (UV), photo radiation, etc.). These radicals begin propagating by adding monomer units in the water phase until they reach a certain length, z, at which they become surface active. Once the radicals reach this length, the z-mers enter the micelles and continue the free radical polymerization, which results in the nucleation of a polymer particle.

In the present invention, one can prepare dye particles from emulsion polymerization by adding the monomer and dye simultaneously, either in portions or continuously as a stream of droplets, in the presence of a surface active agent and a polymerization initiator. The polymerization can be carried out at certain conditions, such as a temperature from about 20° C. to about 90° C. in a nitrogen atmosphere.

The kinds of vinyl monomers that can be used include, for example, a halogen containing compound vinyl fluoride, vinyl chloride, vinyl bromide, vinyl iodide, vinylidene fluoride, vinylidene chloride, polyvinylidene bromide, polyvinylidene iodide, and other halogenated vinyl compounds and their derivatives; or a combination of the compound with at least one halogen-containing compound and other compound include but not limited to styrene, α-methylstyrene, vinyltoluene and other aromatic vinyl compounds; methyl (meth)acrylate, ethyl (meth)acrylate, butyl (meth)acrylate and other (meth)acrylate esters; (meth)acrylonitrile and other vinyl cyano compounds; butadiene.

A functional monomer may be used, if desired, in order to provide the surface functional group for the dye particles. Exemplary functional monomers that may be employed include (meth)acrylic acid, crotonic acid, itaconic acid, and other unsaturated carboxylic acids; sodium styrenesulfonic acid and other unsaturated sulfonic acid salts; 2-hydroxyethyl (meth)acrylate, glycidyl (meth)acrylate and other (meth) acrylate esters; and (meth)acrylamide and N-methylol(meth) acrylamide.

The vinyl monomer can be incorporated with a crosslinkable monomer, if desired, to provide stability and improve resistance to blocking, heat and solvent. The crosslinkable monomers that can be used include, for example, carboxylic acid, ethanolamine, amine, amino, imine, isocyanate, melamine, metal alkoxides, monomer with hydroxyl, epoxy and hydrolysable organosilyl groups, beta-ketoester, ethylene glycol, divinylbenzene, ethylene glycol di(meth)acrylate, trimethylolpropane trimethacrylate and other monomers.

Surface active agents (i.e., surfactants) that may be used include, for example, a single agent or a combination of the agent selected from anionic surface active agents such as sodium alkylbenzenesulfonate, sodium alkylsulfate, sodium dialkylsulfosuccinate and naphthalenesulfonic acid/formaldehyde condensate; and nonionic surface active agents such as polyoxyethylene alkyl ether, polyoxyethylene alkylphenol ether, ethylene oxide/propylene oxide block copolymer and sorbitan fatty acid ester. No particular limitation is imposed upon the concentration or amount of the surface active agent. Typically, however, the amount ranges from about 0.1% to about 10% by weight for the total weight of the monomer used in each layer.

Any kind of polymerization initiator that is commonly used in emulsion polymerization processes can be used for the present invention. Representative polymerization initiators include, for example, persulfates, such as potassium persulfate, sodium persulfate and ammonium persulfate; organic peroxides, such as benzoyl hydroperoxide; and azo compounds such as azobisisobutyronitrile. The polymerization initiator can be employed, if desired, together with a reducing agent in the form of a redox type initiator.

Another embodiment of making colorant particles involves a staining technique. Plain cross-linked particles are first fabricated or prepared by either precipitation technique or emulsion polymerization technique, then those plain particles could be further stained on their outer surfaces with dyes.

Although we describe a co-precipitation and emulsion polymerization method in detail to create dye/ink particles in the examples herein, other methods, such as staining, chemical vapor deposition (CVD) or outer vapor deposition (OVD), or other organic or polymeric doping processes may also be employed.

Section C.—Crosslinking

Crosslinking of polymers is a useful method of enhancing structural integrity of the polymer material. Crosslinked colorant particles are more stable than their non-crosslinked counterparts, hence more resistant to various extremes in temperatures, organic solvents, pH, chemical relativity and the like.

HCPs can be cross-linked by means of either forming a bond or linkage with separate bridging polymers or small molecules that are capable of forming linkages with halogen-containing polymers, or directly interacting linking moieties that are part of the HCP molecules. Examples of some of these latter kinds of materials include, but are not limited to, unsaturated polymers made from unsaturated dicarboxylic acids such as maleic anhydride, maleic acid, fumaric acid and itaconic acid, or polydiethylene glycol-bis(allyl carbonate, polyimides and polybismaleic imides. Homo-bifunctional crosslinkers, which have two identical reactive ends, can also be used. They may include bis(sulfosuccinimidyl)suberate, disuccinimidyl tartrate, and disulfosuccinimidyl tartrate. Examples of hetero-bifunctional crosslinkers, which have two dissimilar reactive ends, may include m-maleimidobenzoyl-N-hydroxysuccinimide ester, [N-(E maleimidocaproyloxy)-succinimide], and maleimide PEG hydrazide polymers, or small molecules that are adapted to form linkages with halogen-containing polymers. The crosslinking of two or more HCPs, in which at least one is the major encapsulating matrix and one or more is a cross-linking polymer has yielded very stable particles.

Another method of cross-linking, in which the polymeric system includes one or more HCPs containing block copolymers and one or more small cross-linking molecules is also contemplated in the invention. The block copolymers can be random and block. The block co-polymer can be selected from di-blocks, tri-blocks, star-blocks and multi-blocks. The arrangement of blocks to blocks can be head to end, head to head, end to end and end group captured. At least one of the co-polymers should have hydrophilic functional groups to provide biological agent binding. Examples include, but are not limited to, copolymers formed by monomers between methylmethacrylate and maleic anhydride, maleic diethylester and fumaric diethylester.

In yet another method of crosslinking, the particles is through the use of a cross-linking colorant material which may be encapsulated by a halogen-containing polymer. Another method is to use a halogen-containing colorant material and a separate cross-linking material. Examples include but are not limited to separate cross-linking materials which are primary amine reactive cross-linkers like imidoester and N-hydroxysuccinimide-esters, sulhydryl reactive cross-linkers like maleimides, haloacetyls and pyridyl disulfides, carbonyl reactive cross-linkers like hydrazides, carbodiimides, and photoreactive cross-linkers like p-azidobenzoyl hydrazide, 4-(p-azidosalicylamido) butylamine and N-hydroxysuccinimidyl-4-azidosalicylic acid. Alternatively, a crosslinking, halogen-containing colorant material may be incorporated to form a secure matrix.

Cross-linking of the particles may be carried out according to conventional methods, such as through heat, photo-initiation and free radical cross-linking. Examples of the copolymers useful for producing cross-linkable colorant particles may include, but are not limited to, copolymers of poly(vinyl chloride) with acrylic acid, maleic acid, vinyl pyridinium, monomers with amino and imine groups, and monomers with sulfonate groups. Other moieties suitable for use as functional groups include epoxy groups, isocyanate groups, melamine groups metal alkoxides, carboxyl groups, hydrolyzable organosilyl groups, and beta-ketoester groups.

An example of HCP and copolymers is vinyl halide copolymerized with unsaturated compounds and/or saturated monomers. Examples of these monomers include but are not limited to carboxyl acid, acrylic, methacrylic and vinyl acetate. One type of polymeric system for encapsulation of colorant molecules is composed of epoxy-functional terpolymers made from vinyl chloride, vinyl acetate, and epoxy-containing monomers and maleic acid-modified vinyl polymers and copolymers.

One type of halogen-containing co-polymer useful for encapsulation of colorant molecules may be expressed, for example, as poly(vinyl chloride)-(monomer I)-(monomer II) and is illustrated in FIGS. 4 and 5. It is believed that the vinyl chloride portion provides good compatibility and high solubility for hydrophobic dye molecules. The monomer I portion is desirably hydrophilic to provide surface functional groups, and the monomer II portion can be used for other purposes such as cross-linking. Specific examples of such copolymers are poly(vinyl chloride-co-vinyl acetate-co-maleic acid) (PVCMA) to provide colorant particles with carboxylic acid on the surface and poly(vinyl chloride-co-vinyl acetate-co-epoxy monomer) (PVCEM).

Figure 6:
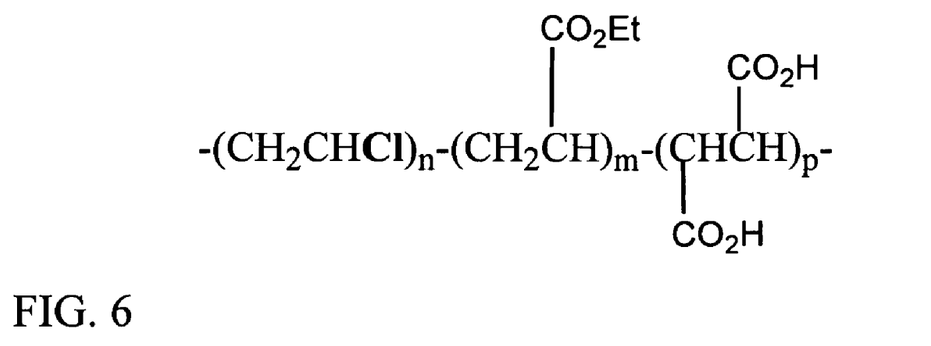
FIG. 6 shows the chemical structure of poly(vinyl chloride-co-vinyl acetate-co-maleic acid) (PVCMA).

The PVCMA (FIG. 6) that was used in some examples contain about 81% vinyl chloride, 17% vinyl acetate and 2% maleic acid. The maleic acid can provide surface functional groups and water-compatibility and vinyl acetate can be used for cross-linking. PVCMA provides an excellent matrix for high loading of aromatic dyes and act as a shield from oxygen, which results in photo-stability of the colorants doped within the particles. PVCMA (average molecular weight ~16, 000) is available commercially from the Dow Chemical Company of Midland, Mich. under the trade name UCAR VMCA. Other source of PVCMA is PolyScience. (86% vinyl chloride, 13% vinyl acetate and 1% maleic acid, average molecular weight ~21,000, Cat. No.18356)

Figure 7:
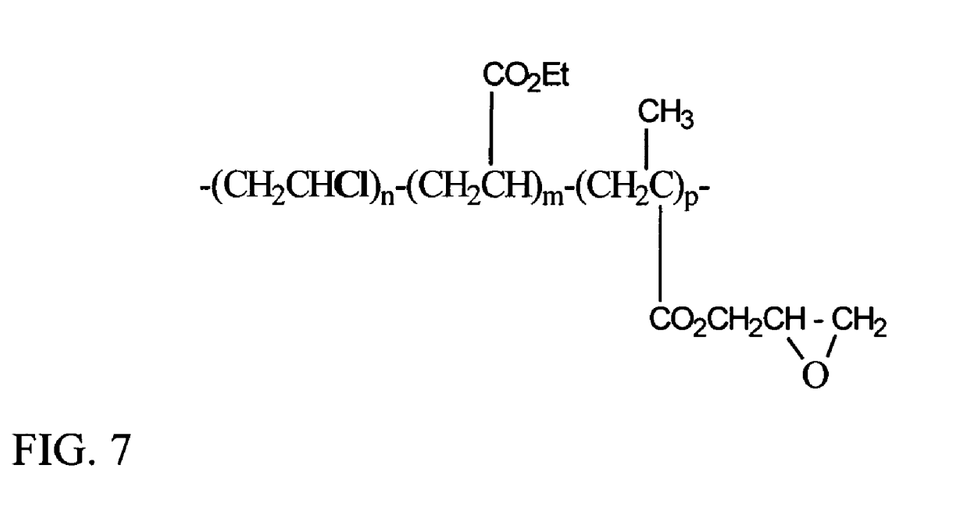
FIG. 7 shows the chemical structure of poly(vinyl chloride-co-vinyl acetate-co-epoxy monomer)(PVCEM).

The PVCEM (FIG. 7) that was used in some examples contain about 82% vinyl chloride, 9% vinyl acetate and 9% epoxy monomer. PVCEM is available commercially from the Dow Chemical Company under the trade name UCAR VERR-40.

Section D.—Functionalization

Colorant particles with surface functional groups (e.g., groups that make the particle material more hydrophilic, chemically reactive, etc.) can be produced by the present invention by using halogen-containing co-polymers. Surface functional groups provide the particles with the ability to interact with other materials by making them chemically reactive, for example, by being hydrophilic, hydrophobic, acidic, basic, etc. The co-polymers have at least two different monomers, one which has halogen atom(s) and is hydrophobic, such as vinylchloride, and the other which desirably has hydrophilic groups such as methacryalate acid, acrylic acid, ethanolamine, polyethylene glycol (PEG), pyridine side chains, ammonium side chains or others.

In the case of hydrophilic functional groups, in order for some of the hydrophilic monomers to stay at or near the particle surfaces, water or water mixing solvents are desirable as the precipitating solvent. In such situations, the hydrophobic portion containing halogen atoms forms part of the particle core along with the encapsulated hydrophobic colorant molecules, and a portion of the hydrophilic groups are situated at an interface where the inner, hydrophobic core phase and outer, hydrophilic phase separate from each other.

To make surface-functionalized particles, polymers and colorant molecules, such as Disperse Orange 3 and Disperse Blue 3, are dissolved in a water-miscible solvent such as DMF or THF. Depending on the particle size desired, the solution may be added to water under stirring, or alternatively, water can be added to the solution to co-precipitate the polymers and colorant molecules. The precipitated particles formed can be further processed or analyzed.

During subsequent process steps such as washing, precipitation, and resuspension in an aqueous medium, the particles exhibit good mechanical stability. The particle size distribution remains fairly constant without change over many cycles of precipitation, washing, and resuspension in water. These characteristics make the colorant particles good candidates for making a colorant solution or ink.

Section E.—Colorant Ink

The colorant particles can be incorporated into a liquid medium, which is referred to as an ink or dye suspension. The colorant medium includes either an aqueous or organic solvent dispersion of: a) at least one type of colorant particle, said particle having one or more kinds of dye molecules doped within a polymeric matrix, said polymeric matrix including either one or more kinds of halogen-containing polymers, or a combination of at least one kind of halogen-containing polymer and a non-halogenated polymer, said polymeric matrix having at least about 5 atomic wt. % of halogen atoms, and said dyes are not released from said vehicle; b) a dispersant aid; and c) a surfactant.

The ink solution comprises a suspension of colorant particles at a concentration of about 1%-80% by weight of the entire solution, in a buffer with a pH value of about 5-8, and deionized water. In certain embodiments, the amount of colorant particles may range from about 5-20% or 25 wt. %. For more depth of color and a deeper dye, preferably, the amount of colorant particles can range from about 30-70 wt. %. The buffer should be in particular situations adapted to help control the printing process, and help the applicator or printer achieve consistently, high-quality printing against various kinds of substrates. The ink solution can also contain one or a combination of the following components: ethylene glycol, diethylene glycol, polyethylene glycol (200, 400, and 600), and glycerine as wetting agents, a surfactant as a particle stabilizer (e.g., $C_{12}$ to $C_{18}$ surfactants such as cetyl trimethyl ammonium chloride and carboymethylamylose), charge carrier (e.g., a quaternary ammonium salt or charged polymers such as polyethylene imine), a viscoelastic property modifier (e.g., glycerol), a crosslinking agent (e.g., epoxy and amines), and a chelating agent (e.g., ethylene-diamine-tetra-acetic acid (EDTA)).

Section F.—Coloring an Article

Using a colorant medium as described, one can create an article of manufacture. A method for coloring an article may include the steps of: providing an work piece to be colored; providing a dyeing solution that includes a photostable colorant that includes a number of photo-oxidation resistant particle made up of a polymeric matrix of at least one kind of halogen-containing polymer and at least one kind of dye dopant, in which the dye dopant is sterically protected from oxidizing agents; and applying the dyeing solution to said work piece.

The article can have a substrate made from either a natural or synthetic material fiber having a colorant applied to at least a portion of the substrate. The colorant comprises a particle with one or more kinds of dye molecules doped within a polymeric matrix. The polymeric matrix includes either one or more kinds of halogen-containing polymers, or a combination of at least one kind of halogen-containing polymer and a non-halogenated polymer. The polymeric matrix has at least about 5 atomic wt. % of halogen atoms, and the dyes are not released from said particle. In some useful embodiments, the substrate can be either a woven or non-woven fabric.

Section III

EXAMPLES

As mentioned before, disperse dyes have been selected as illustrative examples since they are aromatic coloring substances that are free from ionizing groups. Disperse dyes are low molecular weight derivates of azo, anthraquinone, nitrodiphenyl amine and other compounds. They have low water solubility and are suitable for dyeing hydrophobic fibers, such as cellulose acetate, tri acetate, polyamide, polyester, polyacrylonitrite, etc. They melt at about 150° C. or above and are crystalline materials, which can be ground to produce particles of about 0.5-2 μm in size. Disperse dyes are particularly important for polyester fibers, which can be used widely as a component of blends with cotton, wool or any other man-made fiber.

But like most of other dyes, colorfastness to light is a problematic issue for most azo-derived disperse dyes. The disperse dyes of anthraquinone derivative type have been found to be effected by oxides of nitrogen (e.g., $N_2O$) present in gas fumes and fumes from industrial area. The reaction of the nitrogen oxide with the dye results in fading or bleaching of the color. Fabric dye with sensitive disperse dyes, in particular those of blue and violet colors, have to be treated with certain chemicals that act as inhibitors and prevent gas fading. Also, dispersing agents are needed to produce a stable colloidal dispersion in the dye bath and in most of cases, particle size distribution is huge which may cause non-uniform results.

One way to improve the colorfastness to light is to encapsulate the dye into halogen containing polymer and copolymer systems and make stable dye particles. Other polymers, like polystyrene (PS) and polyacrylonitrile (PAN), may also be used achieve the purpose. However, the photo-stability and dye intensity achieved by those polymers may not be not ideal as halogen containing copolymer systems.

One possible reason is that those polymer matrices have relatively high $O_2$ solubility. Another possible reason is the solubility of most of disperse dyes are usually low. As a result, the disperse dyes often aggregate to have a low dye intensity.

Dye particle size distribution and dispersion may also be greatly improved by using dye encapsulated particles which may contribute to better controlled dyeing system and result in more uniform color distributions on substrates.

Surface modification can also be easily achieved by using those unique dye particles which may have variety of surface functional groups. Surface functional dye particles can offer a wide range of application on different substrates and achieve better wash-ness property. Examples include those highly positive surface charged dye particles will be suitable for negative surface charged substrates, like most of acetate fibers. Those surface functional groups may also provide cross-linking properties for dye particles to substrates to prevent dye leaching and photo-leaching.

New dye particles were successfully made using two disperse dyes and functionalizable halogen-based copolymer matrix. Their photo-stability test has been accomplished using Solar Tester System. The new dye particles have been found to have much better light-fastness property, and they will have board range applications such as unique indictors and inks.

Figure 9:
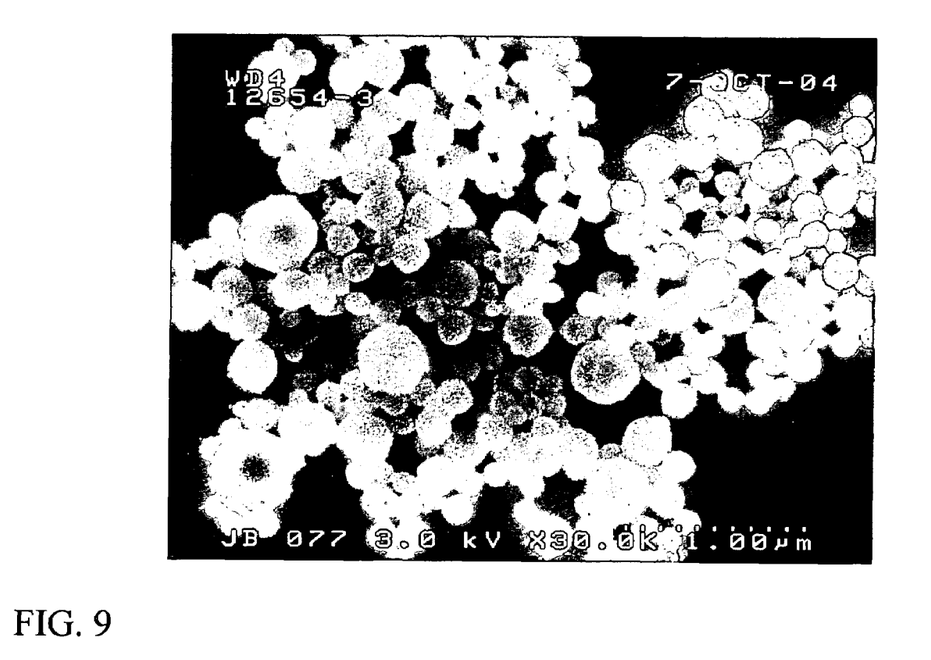
FIG. 9 is a structure of a disperse dye, Blue 3 (max=594nm & 640 nm).

Particles were formed and the particle size is measured using the ZetaPals Particle Size Analyzer (Brookhaven Instrument Corporation) and again characterize using a SEM. FIG. 9, shows the SEM image. The morphology shown in SEM image of FIG. 9 of the poly-dispersed particles (high poly-dispersity) is different from the particles described in A. The particles have a round shape but different particle sizes, ranging from about 100 nm to about 800 nm. Control particles are also make in like fashion.

The particle size and poly-dispersion (nm/PD) results for the two types of colorant particles are summarized in Table 1.

TABLE 1

|  | Copolymer Concentration | Controlled Flow rate | Particle Size (nm) | Polydispersity (PD) |
| --- | --- | --- | --- | --- |
| Mono-dispersed Colorant Particle A | 5 mg/ml | 5 ml/min | 211 +/− 5 | 0.005 +/− 0.005 |
| Poly-dispersed Colorant Particle B | 10 mg/ml | 3 ml/min | 357 +/− 0.8 | 0.14 +/− 0.036 |

According to certain embodiments, the dye-doped material vehicles can have a mean particle size in the range of about 9 or 10 nm to about 25 or 30 μm, desirably about 30 nm to about 5 or 10 μm, more desirably about 50 or 70 nm to about 800 nm, and preferably about 90 or 100 nm to about 500 nm.

The following examples further describe the fabrication of a photo-stable dye-encapsulating particle according to the present invention and illustrate its use. All water used in the examples is filtered and de-ionized.

A. An example of making crosslinkable mono-dispersed colorant particles involves using medium to low polymer concentrations (less than ~7.5 mg/ml) and medium to fast addition rates (faster than ~5 ml/min). One can provide about 4 mg/ml of stock Disperse blue 3 solution prepared by dissolving ~20 mg dye powder in 5 ml DMF and filtered through 0.2 μm filter, and about 5 mg/ml of copolymer of PVCMA and PVCEM (PVCMA:PVCEM=4:1) by dissolving 125 mg polymer into 25 ml of THF, respectively. Mix and heat the vials briefly to ensure complete dissolution of the polymers, then vigorously agitate the PVCMA:PVCEM mix (4:1) of 600 μl THF with 10% Disperse blue 3 mix solution, while 3 ml of filtered distilled water is added into the vial at 5 ml/min flow rate controlled by a syringe pump. A control sample is made using the same amount of dye and solvent, but without copolymers PVCMA and PVCEM.

Figure 8:
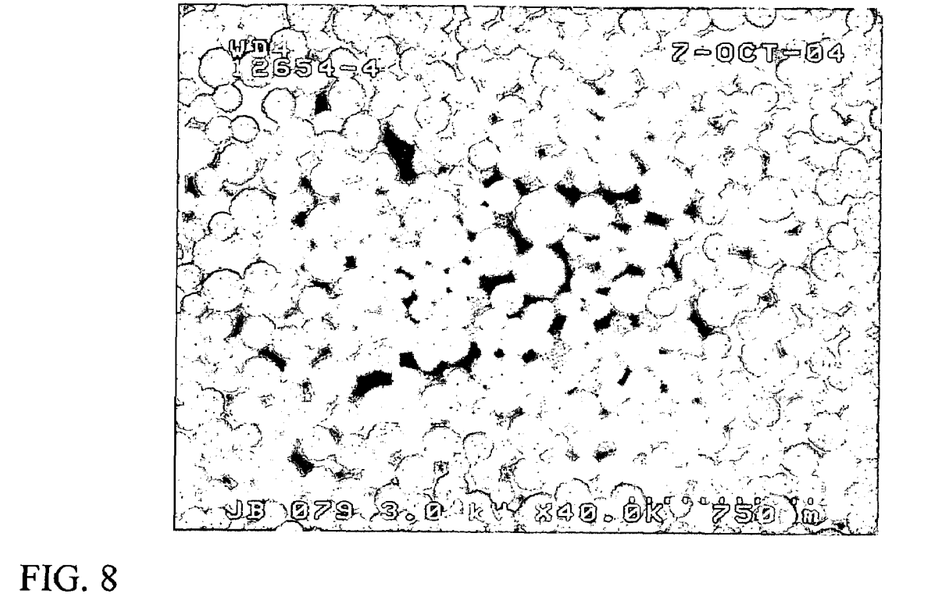
FIG. 8 is a structure of a disperse dye, Orange 3 (max=443 nm).

Particles were formed and the particle size is measured using a ZetaPals Particle Size Analyzer (Brookhaven Instrument Corporation) and characterize using a scanning electron microscope (SEM). The SEM image is shown in FIG. 8. The average sizes of the particles in the SEM image are about 200-215 nm. The particle morphology of the mono-dispersed particles (low poly-dispersity) is a very uniform, round shape.

B. An example of making crosslinkable poly-dispersed colorant particles involves using relatively high polymer concentrations (greater than ~7.5 mg/ml) and slow participant addition rates (slower than ~5 ml/min). One can provide about 4 mg/ml of stock Disperse blue 3 solution is prepared by dissolving 20 mg dye powder in 5 ml DMF and filtered through 0.2 μm filter. About 10 mg/ml of copolymer of PVCMA and PVCEM (PVCMA:PVCEM=4:1) is prepared by dissolving 250 mg polymer into 25 ml of THF respectively. The vials were stirred and heated briefly to ensure complete dissolution of the polymers. PVCMA/PVCEM mix (4:1) of 600 μl THF with 10% Disperse blue 3 mix solution was stirred vigorously, while 3 ml of filtered distilled water was added into the vial at 3ml/min flow rate controlled by the Syringe Pump.

The following provides additional detailed examples of manufacturing processes of the dye particles by choosing various solvents and polymer and copolymer ratios, and which further describe the present invention. For purpose of illustration, the examples describe the invention in use with disperse dyes, however, the nature of the invention should not be construed only as applicable to this one type of dye. Step 1—Solution Preparation: 5 mg/ml solutions of PVCEM (Dow's UCAR VERR-40) and PVCMA (Dow's UCAR VMCA) were prepared by dissolving 125 mg of each polymer into 25 ml of THF, acetone, DMF and DMSO in eight separate vials, respectively. The vials were stirred and heated briefly to ensure complete dissolution of the polymers. Step 2—Mixed 600 μl solutions of PVCEM and PVCMA were prepared at various ratios by weight of 0/100, 20/80, 50/50, 80/20 and 100/0. Step 3—While stirring each mixed solution vigorously, 3 ml of water is added dropwise to each vial, causing particles to form. The particle size was measured using a ZetaPALS Particle Size Analyzer (Brookhaven Instruments, Co., Holtsville, N.Y.). For the measurements, 2.20 is used for refractive index of particles and 90° angle is used. The particle size and poly-dispersion (nm/PD) results are given in Table 2.

TABLE 2

| Particle Size and Poly-dispersion (nm/PD) | | | | |
| --- | --- | --- | --- | --- |
| PVCEM/PVCMA Ratio | | | | |
| 0/100 | 20/80 | 50/50 | 80/20 | 100/0 |
| --- | --- | --- | --- | --- |
| THF 113/0.050 | 133/0.085 | 97/0.081 | 73/0.193 | 184/0.093 |
| DMF 99/0.373 | 78/0.190 | 73/0.210 | 89/0.339 | — |
| Acetone 63/0.093 | 105/0.080 | 72/0.177 | 92/0.112 | 368/0.054 |
| DMSO 76/0.354 | 133/0.336 | 82/0.281 | 89/0.260 | 158/0.103 |

Particle Crosslinking

Figure 10:
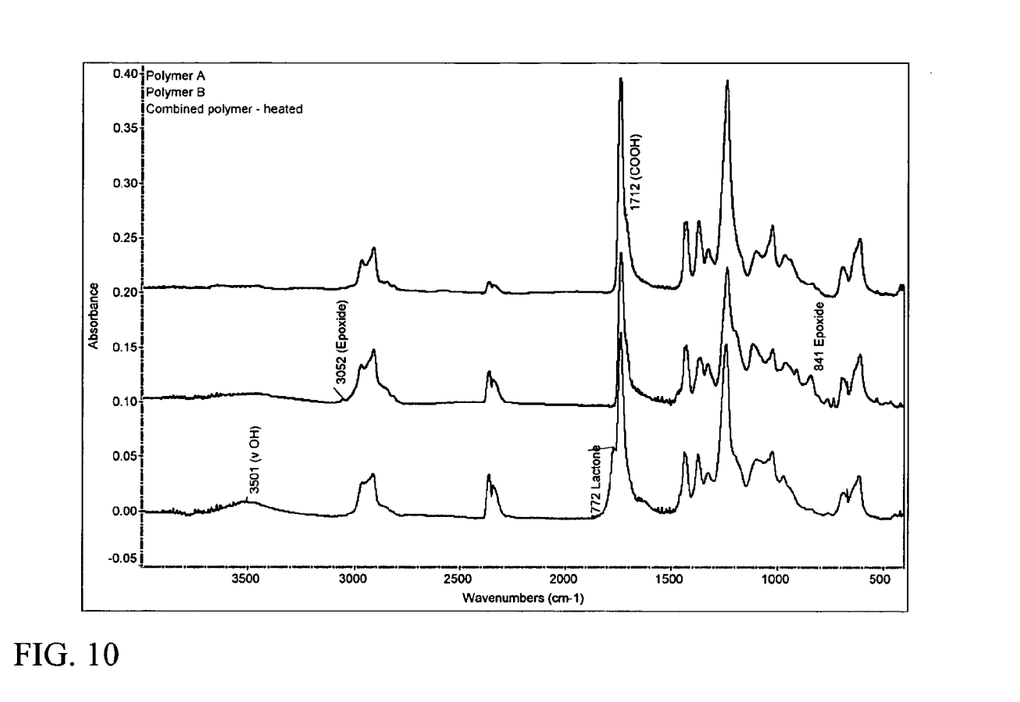
FIG. 10 is a diagram of Fourier Transform InfraRed (FTIR) Spectrum for PVCMA, PVCEM, and Cross-linked 20/80 PVCEM/PVCMA particles

FIG. 10 is diagram of FTIR Spectrum for PVCMA, PVCEM, and Cross-linked 20/80 PVCEM/PVCMA particles. The 20/80 PVCEM/PVCMA solution in THF was heated at 150° C. for 20 minutes in order to cross-link it. After heating, infra-red (IR) analysis was performed and the spectrum compared to each component's pure spectrum. FIG. 10 shows the three spectra and indicates that cross-linked particles were successfully made. In FIG. 10, the uppermost line is PVCMA, the middle line is PVCEM and the lowest line is the cross-linked PVCEM/PVCMA. The scale in FIG. 10 on the y axis is absorbance in nm and on the x-axis is the wave number in cm$^{-1}$.

As discussed above, examples of some groups that can be adapted to crosslink and/or used to modify the surface functional groups of the polymer encapsulant may include, but is not limited to, epoxy, isocynate, melamine, hydrolyzable organosilyl, beta-keto-ester, or carboxyl groups, and metal alkoxides.

Example 1

Halogen-Containing Copolymers for Dispense Orange 3

Halogen-containing copolymers were considered for dye encapsulation because they normally have low oxygen permeability and may be compatible with nonionic aromatic disperse dyes. The example structure of the halogen-containing copolymer (PVCMA) is shown in FIG. 6a.

Figure 6A:
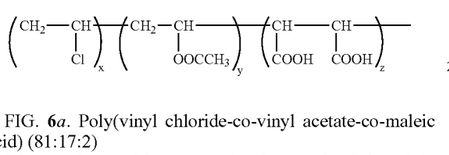

FIG. 6a. Poly(vinyl chloride-co-vinyl acetate-co-maleic acid) (81:17:2)

Figure 11:
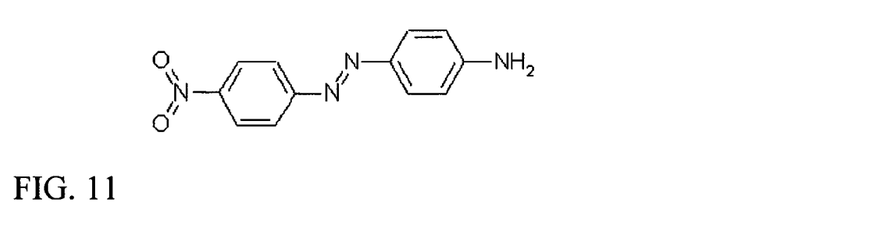
FIG. 11 is an SEM image of crosslinkable mono-dispersed halogen particles.

Disperse Orange 3 is an example of an azo dye. It is mainly used to dye acetate, polyamide polyester, and polyacrylonitrile. Its structure is shown in FIG. 11. About 4 mg/ml of stock disperse Orange 3 solution is prepared by dissolving 20 mg dye powder in 5 ml DMF and filtered through 0.2 µm filter. 5 mg/ml of copolymer of PVCMA is prepared by dissolving 125 mg polymer into 25 ml of THF. The vials were stirred and heated briefly to ensure completely dissolution of the polymers. PVCMA of 600 µl THF with 10% disperse Orange 3 mix solution is stirred vigorously, while 3 ml of filtered distilled water is added drop-wise into the vial.

Particles were formed and the particle size is measured using the ZetaPals Particle Size Analyzer and characterize by SEM. Control is made using the same amount of dye and solvent without polymer PVCMA.

Example 2

Cross-Linkable Halogen-Containing Copolymers for Disperse Blue 3

Cross-linkable halogen-containing copolymers may have an epoxy-functional group for cross-linking. The structure of a cross-linkable polymer (PVCEM) is shown in FIG. 7a.

Figure 7A:
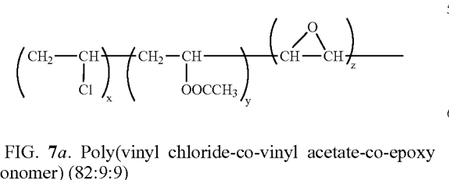

FIG. 7a. Poly(vinyl chloride-co-vinyl acetate-co-epoxy monomer) (82:9:9)

Figure 12:
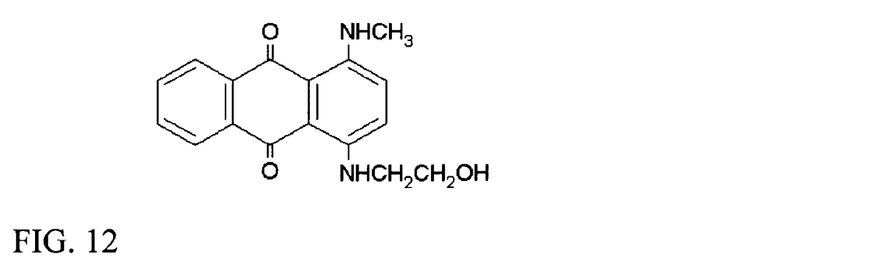
FIG. 12 is an SEM image of crosslinkable polydispersed halogen particles.

Disperse Blue 3 dye is anthraquinone, which has a chemical structure illustrated in FIG. 12. About 4 mg/ml of stock disperse Blue 3 solution is prepared by dissolving 20 mg dye powder in 5 ml DMF and filtered through 0.2 µm filter. 5 mg/ml of copolymer of PVCMA and PVCEM is prepared by dissolving 125 mg polymer into 25 ml of THF respectively. The vials are stirred and heated briefly to ensure complete dissolution of the polymers. PVCMA/PVCEM mix (4:1) of 600 µl THF with 10% disperse Blue 3 mix solution is stirred vigorously, while 3 ml of filtered distilled water is added drop-wise into the vial.

Particles are formed and the particle size is measured using the ZetaPals Particle Size Analyzer and characterize by SEM. Control is made using the same amount of dye and solvent without polymers PVCMA and PVCEM.

Example 3

Washing and Crosslinking the Dye Particles

Dye particles made in experiment 1 & 2 were washed by dialyzing against 4 liters of deionized water. Fresh deionized water is changed at about 2 hr, 6 hr and 24 hr time points. Cross-linked Disperse Blue dye particles were prepared by keeping washed dye particles in a drying oven at about 80° C. for 4 hours. Particle size and poly-dispersion results for those washed and cross-linked Disperse dye particles were listed in the following Table 3.

TABLE 3

| Particle Size and Polydispersion (nm/PD) for Dye Particles | | | | |
|---|---|---|---|---|
| Dye | Disperse Orange 3 | Washed | Disperse Blue 3 | Washed & Cross-linked |
| nm/PD | 135/0.005 | 141/0.021 | 176/0.005 | 180/0.045 |

Example 4

Photo Stability Study by Photo-Bleaching Test

Each of the dye particle suspension prepared in Examples 1 & 2 were tested for their photo-stability using Solar Test System along with the dye control solutions. Photo-bleaching tests were done by exposing samples to 500 walts of solar simulating source for 2 hours. Light intensity of each dye particle suspensions and dye solutions were measured using photometer before and after photo-bleaching.

Figure 13:
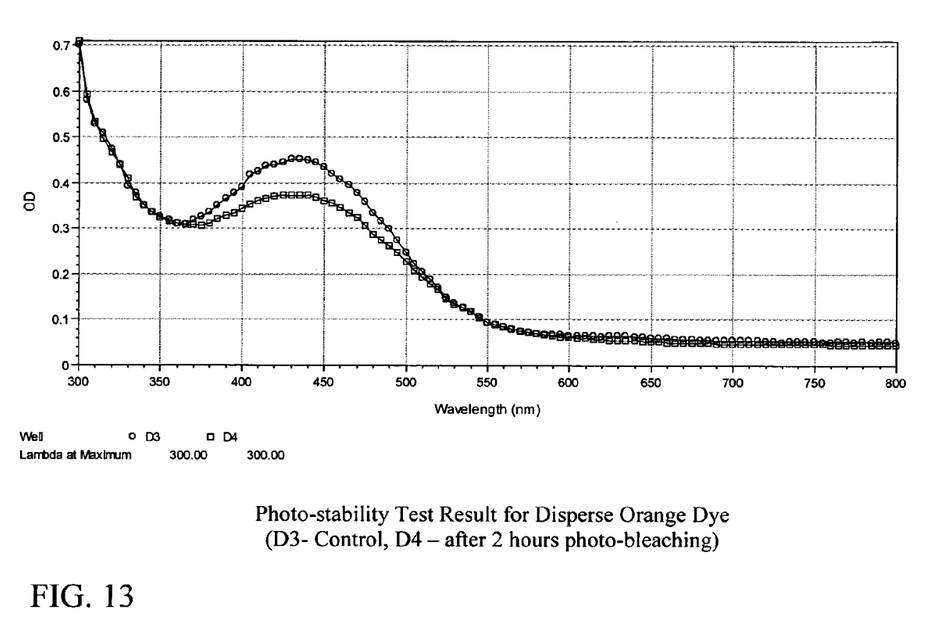
FIG. 13 is a graph illustrating the relative photostability of the disperse orange dye before and after photo-bleaching.

FIG. 13 shows the light intensity of orange dye solution before and after photo-bleaching. As shown in FIG. 13, D3 is the disperse Orange 3 dye absorbance curve before solar exposure treatment, and D4 is the disperse Orange 3 dye absorbance curve after exposure for 2 hours under the solar tester. The light intensity for peak absorbance at 443 nm decreased almost 25% after 2 hour solar tester treatment, which confirmed that there is light fastness issue for Disperse Orange 3 dye. The light fastness issue is also seen for Disperse Blue dye.

Figure 14:
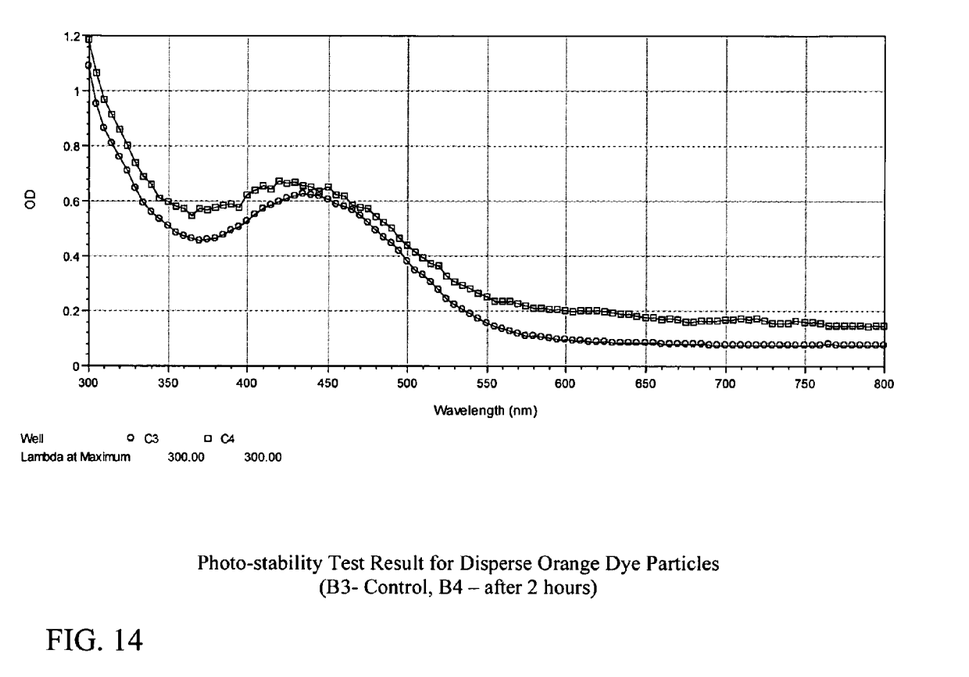
FIG. 14 is a graph illustrating the protective effect of the capsule material and its beneficial effect on the photostability of the disperse dye after encapsulation according to the present invention.

FIG. 14 shows the light intensity of orange dye particle before and after photo-bleaching. It can be seen that the light intensity at peak absorbance 443 nm remained un-changed after 2 hours under the solar tester. In FIG. 14, C3 represents the absorbance curve for disperse Orange 3 dye particle before solar exposure treatment, and C4 represents the absorbance curve for disperse Orange 3 dye particle after exposure for 2 hours under the solar tester, which suggested the orange dye particles achieved superior light-fastness property when compared with its control.

Figure 15:
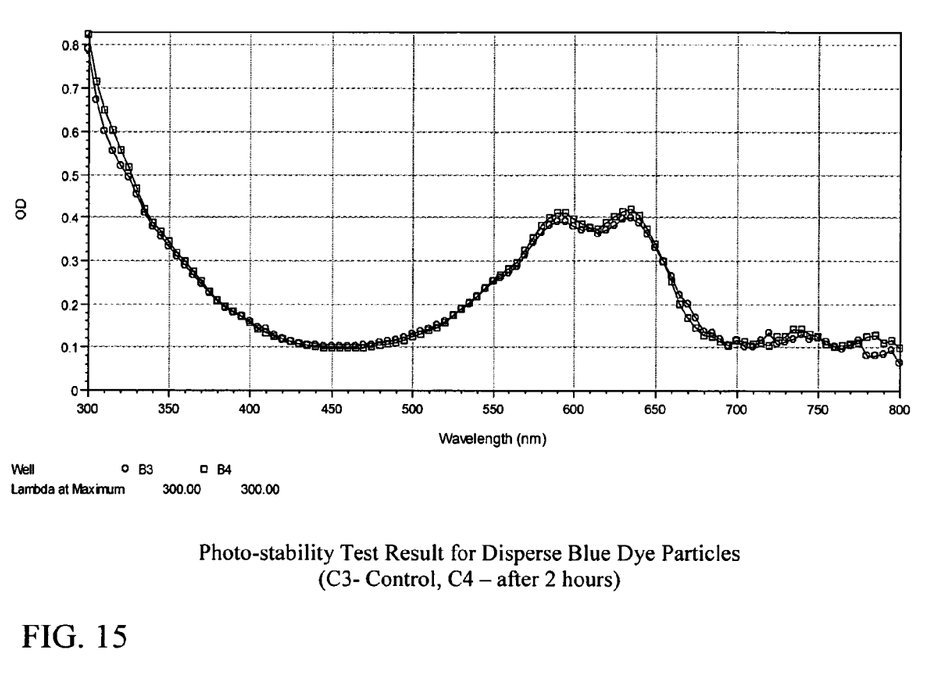
FIG. 15 is a graph that shows the intensity of blue dyes encapsulated in the present colorant particles before and after photo-bleaching.

Premium light fastness properties have been also observed for blue dye particles. FIG. 15 shows the intensity of blue dye particles at peak absorbencies 594 nm and 640 nm remained un-changed before and after photo irradiation for 2 hours. In FIG. 15, B3 represents the absorbance curve for disperse Blue 3 dye particles before photo treatment, and B4 represents the absorbance curve for the disperse blue dye particles after exposure two hour under the solar tester. The results suggest that the blue dye particles achieved superior light-fastness property when compared with its control.

Example 5

Dye Particle Surface Modification Study

Dispersed dye particle surface property can be manipulated by different surface functional groups like carboxyl, sulfate, hydroxyl, or carboxylate. For example, the zeta potential for disperse blue 3 particles made by using polyvinyl chloride (PVC) is −16 mv, while disperse blue 3 particles made by PVCMA/PVCEM in Example 2 is −60 mv. Another example, stable and cationic dispersed dye particles can also be made by dialyzing dye particles against 1% cationic polymer—Poly(acrylamide-co-diallyldimethyl-ammonium chloride (PDMC, from Aldrich, CAT# 26590-05-6) for 24 hours followed by crosslinking and washing procedure. Various of surface functional dye particles can offer a wide range of application on different substrate through different surface chemistry. The following Table 4 lists several disperse Blue 3 particles' zeta potential results.

TABLE 4

Different Surface Charge of Different Dye Particles

| Dye Particles | Disperse Blue 3/ PVC | Disperse Blue 3/ PVCMA | Disperse Blue 3/ PVCMA/PVCEM | Disperse Blue 3/ PVCMA/PVCEM/PDMC |
|---|---|---|---|---|
| Zeta Potential (mv) | −16 | −60 | −48 | +54 |

The present invention has been described both in general and in detail by way of examples. Persons skilled in the art will understand that the invention is not limited necessarily to the specific embodiments disclosed. Modifications and variations may be made without departing from the scope of the invention as defined by the following claims or their equivalents, including equivalent components presently known, or to be developed, which may be used within the scope of the present invention. Hence, unless changes otherwise depart from the scope of the invention, the changes should be construed as being included herein.

We claim:

1. Colorant particle wherein each particle comprises: one or more kinds of non-phosphorescent colorant molecules doped within a polymeric matrix, said polymeric matrix including either one or more kinds of halogen-containing polymers or oligomers, or a combination of at least one kind of halogen-containing polymer or oligomer and a halogen-free polymer or oligomer, said polymeric matrix having at least about 5 atomic wt. % of halogen atoms, and said colorant molecules are not releasable from said particle.

2. The colorant particles according to claim 1, wherein said colorant molecules are resistant to photo-induced degradation.

3. The colorant particles according to claim 1, wherein said particle has a functionalizable exterior surface.

4. The colorant particles according to claim 1, where said colorant molecules include at least one of the following: dispersed dyes, azoic or naphthol dyes, carbonyl dyes, cyanine dyes or phthalocyanine dyes.

5. The colorant particle according to claim 1, wherein said colorant molecules are embedded and encapsulated within a particle.

6. The colorant particle according to claim 1, wherein said colorant molecules are sterically isolated from oxidizing or reducing agents.

7. The colorant particles according to claim 1, wherein said polymeric matrix segregates individual colorant molecules in the matrix.

8. The colorant particles according to claim 1, wherein said polymer matrix is either cross-linked or not cross-linked with itself.

9. The colorant particles according to claim 1, wherein said polymer matrix includes at least one of the following functional groups: an epoxy, carboxylic acid, ethanolamine, hydroxyl, amine, amino, imine, isocyanate, melamine, metal alkoxides, hydrolysable organosilyl, beta-ketoester and polyethylene glycol.

10. The colorant particles according to claim 1, wherein said halogenated polymer has at least one functional group.

11. The colorant particles according to claim 1, wherein said halogen free polymer has at least one functional group.

12. The colorant particles according to claim 11, wherein said functional group includes: an epoxy; aldehyde; carboxyl acid; bydroxyl; primary, secondary, or tertiary armines; amino; imines; melamine; isocynate; sulfonate; metal alkoxides; hydrolysable organosilyl; beta-ketoester, or polyethylene glycol functional group.

13. The colorant particles according to claim 1, wherein said particle is non-porous.

14. The colorant particles according to claim 1, wherein said particles have a mean particle size in a range from about 9 nm to about 80 μm.

15. The colorant particles according to claim 14, wherein said particles have a mean particle size in a range from about 50 nm to about 15 μm.

16. The colorant particles according to claim 1, wherein a number of said particles are either mono-dispersed or poly-dispersed.

17. The colorant particles according to claim 1, wherein said particles is mechanically stable in a temperature range of about 1° C. to about 120° C. and resistant to physical degradation under pH environments of about 2-12.

18. The colorant particles according to claim 1 wherein said particles are chemically stable in medium including organic solvents, surfactants, or electrolytes.

* * * * *